United States Patent
Boehl

(10) Patent No.: US 12,489,640 B2
(45) Date of Patent: Dec. 2, 2025

(54) DISTRIBUTED STATEFUL HASH-BASED SIGNATURES

(71) Applicant: NXP B.V., Eindhoven (NL)

(72) Inventor: Florian Boehl, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/621,731

(22) Filed: Mar. 29, 2024

(65) Prior Publication Data
US 2025/0310119 A1    Oct. 2, 2025

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01)

(58) Field of Classification Search
CPC .................................................. H04L 9/3247
See application file for complete search history.

(56) References Cited

U.S. PATENT DOCUMENTS

| | | | |
|---|---|---|---|
| 2020/0045028 A1 | 2/2020 | Norum | |
| 2021/0306155 A1* | 9/2021 | Sastry | H04L 9/3236 |
| 2022/0086009 A1* | 3/2022 | Vacek | H04L 9/0877 |
| 2024/0039734 A1* | 2/2024 | De Santis | H04L 9/3236 |
| 2024/0356736 A1* | 10/2024 | Relyea | H04L 9/3236 |

FOREIGN PATENT DOCUMENTS

| | | |
|---|---|---|
| EP | 3886360 A1 | 11/2020 |
| EP | 3965360 A1 | 7/2021 |
| WO | 2023/063957 A1 | 11/2023 |

OTHER PUBLICATIONS

David A. Cooper, et al., "Recommendation for Stateful Hash-Based Signature Schemes," NIST Special Publication 800-208, https://doi.org/10.6028/NIST.SP.800-208, Oct. 2020.
Kelsey. John et al.; "Coalition and Threshold Hash-Based Signatures"; IACR, International Association for Cryptologic Research; Paper 2022/241; Last of 3 Revisions Jul. 1, 2025; Published by the IACR in CIC 2025; https://ia.cr/2022/241.

* cited by examiner

*Primary Examiner* — Bradley W Holder

(57) ABSTRACT

A system and method of producing a key for a digital signature method, including: providing a plurality of initial hardware security modules (HSM) with global public key parameters; running key generation to produce sub-public keys for respective sub-trees associated with the plurality of initial HSMs based upon the global public key parameters; picking a random seed and generating a sub-public key and a sub-tree based upon the random seed for a plurality of virtual HSMs; sending the sub-public keys of the plurality of initial HSMs to a root HSM; computing an overall public key of a tree structure associated with the root HSM; distributing the sub-public keys for the initial HSMs to the plurality of initial HSMs; splitting the random seed of the virtual HSMs into a plurality of key shares; and providing custodians associated with the plurality of virtual HSMs a key share from the plurality of key shares.

20 Claims, 3 Drawing Sheets

DISTRIBUTED STATEFUL HASH-BASED SIGNATURES

FIELD OF THE DISCLOSURE

Various exemplary embodiments disclosed herein relate to long-term signing with distributed stateful hash-based signatures.

BACKGROUND

Stateful hash-based signatures are an important solution for secure digital signatures in face of an adversary equipped with a quantum computer with the capability to break classic cryptographic signature schemes, because as currently understood stateful hash-based signatures are resistant to known quantum algorithms and methods. Accordingly, stateful hash-based signatures may be used as a post quantum cryptography (PQC) signature scheme.

SUMMARY

A summary of various exemplary embodiments is presented below.

A method of producing key for a digital signature method, including: providing a plurality of initial hardware security modules (HSM) with global public key parameters; running key generation by the plurality of initial HSMs to produce sub-public keys for respective sub-trees associated with the plurality of initial HSMs based upon the global public key parameters; picking a random seed and generating a sub-public key and a sub-tree based upon the random seed for a plurality of virtual HSMs; sending the sub-public keys of the plurality of initial HSMs to a root HSM; computing by the root HSM an overall public key of a tree structure associated with the root HSM; distributing the sub-public keys for the initial HSMs to the plurality of initial HSMs; splitting the random seed of the virtual HSMs into a plurality of key shares; and providing custodians associated with the plurality of virtual HSMs a key share from the plurality of key shares.

Various embodiments are described, further including generating the global public key parameters by the root HSM.

Various embodiments are described, further including remembering a sub-public key of the plurality of virtual HSMs.

Various embodiments are described, wherein the random seed is a cryptographically strong random seed.

Various embodiments are described, further including: installing personal encryption keys for each custodian in the root HSM; and encrypting the key shares with personal encryption keys associated with the custodian.

Various embodiments are described, further including privately displaying a key share of the plurality of key shares with an associated custodian.

Various embodiments are described, further including defining a number of initial HSMs in the plurality of initial HSMs and a number of virtual HSMs in the plurality of virtual HSMs.

Various embodiments are described, further including signing a message with a signature key associated with a leaf in one of the plurality of initial HSMs.

Various embodiments are described, further including signing a message with a signature key associated with a leaf in one of the plurality of virtual HSMs.

Various embodiments are described, further including dividing a sub-tree associated with an instance of a virtual HSM by adding an additional layer to the sub-tree associated with the instance of the virtual HSM.

Further various embodiments relate to a key generating device, including: a root hardware security module (HSM); a plurality of initial HSMs; and a plurality of virtual HSMs with custodians associated with the plurality of virtual HSMs, wherein the root HSM is configured to: provide the plurality of initial HSMs with global public key parameters; pick a random seed and generate a sub-public key and a sub-tree based upon the random seed for a plurality of virtual HSMs; compute an overall public key of a tree structure associated with the root HSM; distribute the sub-public keys for the initial HSMs to the plurality of initial HSMs; split the random seed of the virtual HSMs into a plurality of key shares; and provide the custodians associated with the plurality of virtual HSMs a key share from the plurality of key shares; wherein the plurality of initial HSMs are configured to: run key generation to produce sub-public keys for respective sub-trees associated with the plurality of initial HSMs based upon the global public key parameters; and send the sub-public keys of the plurality of initial HSMs to the root HSM.

Various embodiments are described, wherein the root HSM is further configured to generate the global public key parameters by the root HSM.

Various embodiments are described, wherein the root HSM is further configured to remember the sub-public key of the plurality of virtual HSMs.

Various embodiments are described, wherein the random seed is a cryptographically strong random seed.

Various embodiments are described, wherein the root HSM is further configured to: install personal encryption keys for each custodian in the root HSM; and encrypt the key shares with personal encryption keys associated with the custodian.

Various embodiments are described, wherein the root HSM is further configured to privately display a key share of the plurality of key shares with an associated custodian.

Various embodiments are described, wherein the root HSM is further configured to define a number of initial HSMs in the plurality of initial HSMs and a number of virtual HSMs in the plurality of virtual HSMs.

Various embodiments are described, wherein one of the plurality of initial HSMs is further configured to sign a message with a signature key associated with a leaf in one of the plurality of initial HSMs.

Various embodiments are described, wherein the one of the plurality of virtual HSMs is further configured to sign a message with a signature key associated with a leaf in one of the plurality of virtual HSMs.

Various embodiments are described, wherein the root HSM is further configured to divide a sub-tree associated with an instance of a virtual HSM by adding an additional layer to the sub-tree associated with the instance of the virtual HSM.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
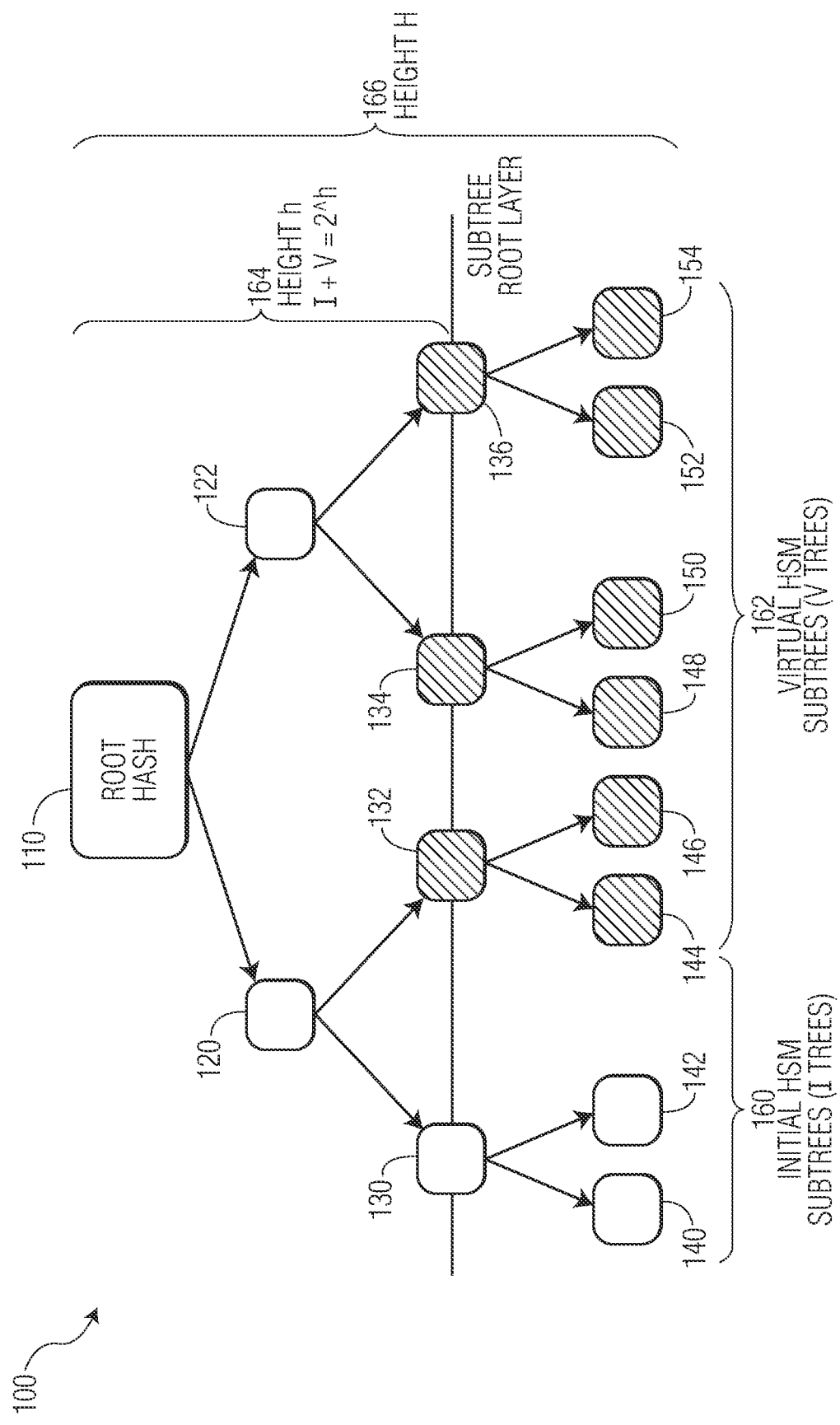
FIG. 1 illustrates an example of an HSM tree structure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of PQC stateful hash-based signature methods and systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Stateful hash-based signatures are an important solution for secure digital signatures in face of an adversary equipped with a quantum computer with the capability to break classic cryptographic signature schemes, because as currently understood stateful hash-based signatures are resistant to known quantum algorithms and methods. Accordingly, stateful hash-based signatures may be used as a post quantum cryptography (PQC) signature scheme. A major drawback of stateful hash-based signatures is that a state must be maintained together with the private signing key and for this reason the general recommendation is to keep the signing key together with the state in a hardware security module (HSM). As a consequence, hardware failures or end of life of the HSM put the long-term signing capability at risk. There is a body of related work that addresses this through either instantiating a signing setup with multiple HSMs with disjoint state spaces or with multiple HSMs together with a solution to sync the state. This disclosure builds on the idea that multiple HSMs with a disjoint state space to avoid the drawbacks of syncing solutions and introduces the idea of deferred HSM instantiation. Through a key generation procedure allowing for virtual HSMs to be instantiated later and an operation procedure with key custodians, a compromise is reached that minimizes the risk of state collisions while allowing for maintaining a signing capability of periods far beyond the typical lifetime of an HSM.

The stateful hash-based signature methods and systems disclosed herein address the problems or disadvantages of the prior solutions. Stateful hash-based signatures are an important solution for secure digital signatures in face of an adversary equipped with a quantum computer with the capability to break classic cryptographic signature schemes.

A drawback of stateful hash-based signatures is that a state must be maintained together with the private signing key. If the private signing key is used to sign two different messages using the same state information, the security of the signing key is compromised. Usually, the recommended approach is to keep the state together with the signing key in a HSM. The HSM guarantees that the state is correctly updated with every signing operation and hence that a state is never re-used.

An important drawback of such a setup is that the signing key exists only in one dedicated HSM. When the HSM hardware fails, the signing key may be lost. To overcome this issue, the signing key may be generated across different HSMs such that the state space of the HSMs do not overlap. A common public key can then be computed for this population of HSMs and as long as one HSM is still available (and has not depleted its state), new messages may be signed. This is what National Institute of Science and Technology 800-208 standard proposes.

The drawback of such a distributed signing key is that the overall long-term signing capability still relies on having one working HSM. With HSM life expectancy around 15 years according a current HSM vendor, there is a significant risk that signing capability is lost while messages still need to be signed (e.g., for a 30 year long secure update commitment).

PQC stateful hash-based signature methods and systems will be described that address this drawback by allowing for a hybrid key pair generation which instantiates a set of signing HSMs immediately and at the same time keeps a desired amount of key seeds for later instantiation of additional signing HSMs. The key seeds are split into seed shares that are distributed to key custodians. Here, Shamir's secret sharing is used to reach the desired levels of security and availability. Every key seed is used only for the later instantiation of exactly one HSM. All subkeys have their own state space and every subkey is kept in only one HSM managing that space. Hence there is no risk of state collisions and no need to synchronize states.

A feature of the PQC stateful hash-based signature methods and systems is a method to generate and manage signing keys for stateful hash-based signature schemes such that a set of live signing HSMs can be flexibly maintained. This means that HSMs can be added to the set if needed (e.g., to replace an HSM to be decommissioned, one that had a hardware failure, or to increase set size for more throughput), and HSMs can be decommissioned from the set securely. This allows for optimizing the setup taking the required longevity (=number of years for which the signing capability must be maintained), availability (as in uptime of signing capability) and throughput (as in bandwidth, i.e., signatures that can be created in a given time frame) into account.

The PQC stateful hash-based signature methods and systems disclosed herein utilizes the Merkle tree structure of stateful hash-based signature schemes such as LMS or XMSS to split up the signing key corresponding to a public verification key into different parts. To a verifier, this split is transparent, i.e., the standard verification algorithm can be used without changes.

The implementation of this PQC stateful hash-based signature methods and systems depends on the following building blocks: key custodians, a root HSM, and a cryptographically secure pseudorandom function (PRF). A key custodian is a trusted person that will receive shares of secret key material and has the responsibility of keeping their shares secret and destroying them after use. A root HSM is responsible for seeding the private keys of all virtual HSMs and for providing the output of seed shares to key custodians. A wide range of implementations of cryptographically secure PRFs exist.

FIG. 1 illustrates an example of an HSM tree structure. The HSM tree structure 100 includes a root HSM 110. The HSM tree structure 100 has a total tree height H 166. In this example there are three layers below the root HSM 110. The first layer includes two HSMs 120 and 122. The third layer includes four HSMs 130, 132, 134, and 136. The fourth layer includes eight HSMs 140, 142, 144, 146, 148, 150, 152, and 154. FIG. 1 also illustrates initial HSM subtrees 160 (I trees) and virtual HSM subtrees 162 (V trees).

Before key generation, several parameters must be chosen for the key. The choice of these parameters depends on the use case for the key and may include the following parameter choices. The number of initial HSMs I 160 is set. I=0 is a special case where only virtual HSMs are created and only the root HSM is needed for that. The number of virtual HSMs V 162 is set. V=0 is a special case where no virtual HSMs are created and this parameter choice leads to a method and system that become equivalent to NIST SP 800-208 section 7 method. This is a benefit of this proposal as an implementation may always be 166 instantiated as fully NIST compliant.

In the following description, I+V is a power of 2, specifically $2^h$ 164. This is not a technical restriction but allows for a more convenient description. It is also possible to work with values for I+V that are not a power of two by pulling subtrees for some initial or virtual HSMs a layer up in the tree structure and consequently have subtrees of different heights. However, this complicates the implementation and description without adding any value.

The stateful hash-based signature scheme and parameters to use are chosen. One parameter is the total tree height H 166 which must be greater than h. Every HSM will be able to sign $2^{H-h}$ messages.

A number of key custodians C is also chosen. The number of key custodians depends on the desired security level (more custodians=higher security).

Finally, the number of seed shares S that are required to reconstruct a seed is chosen. There are C shares of which S are then needed to instantiate a virtual HSM. A larger value of S increases confidentiality (up to S=C which is the strongest choice for seed confidentiality). A lower value of S allows for availability in case key shares are lost.

Figure 2:
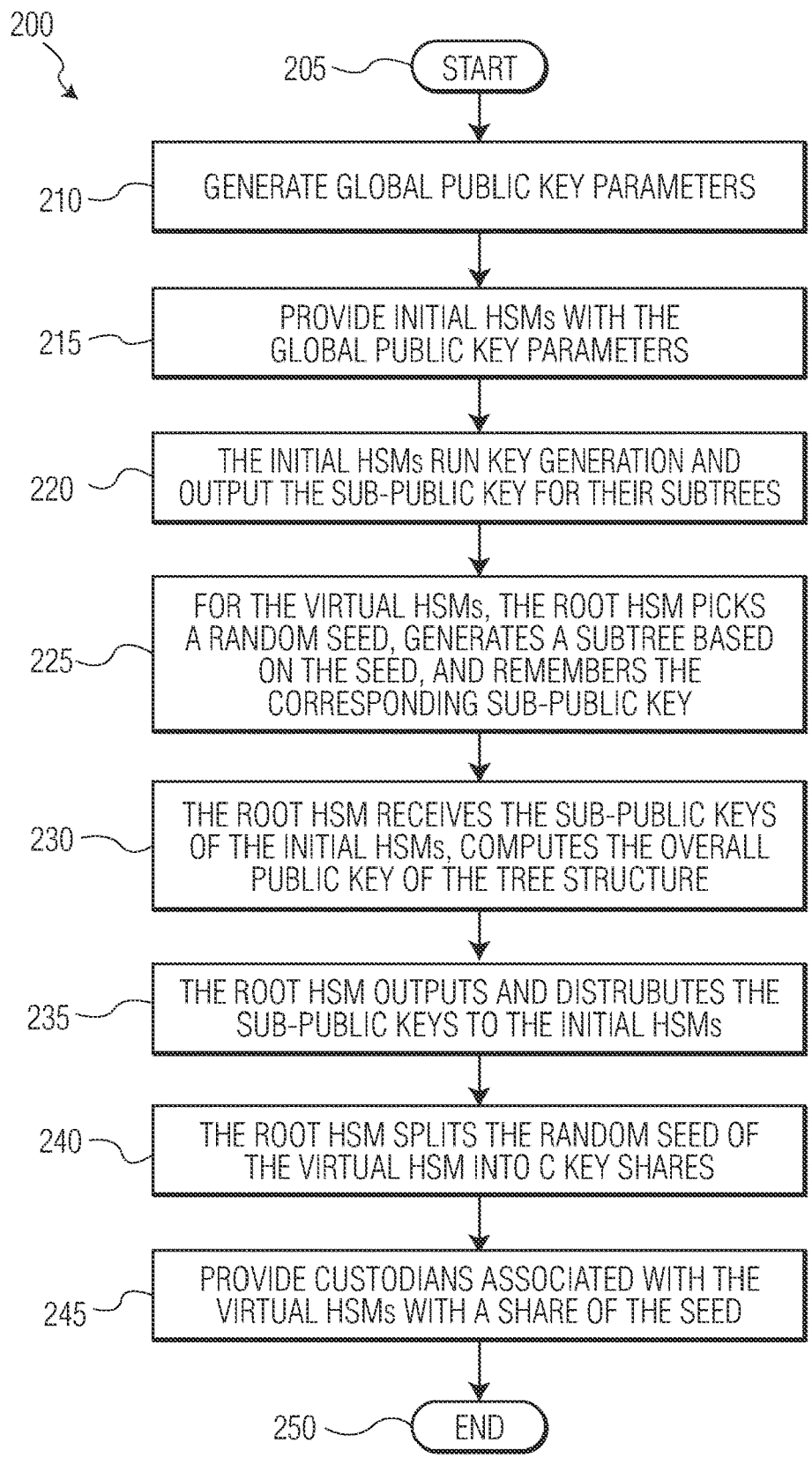
FIG. 2 illustrates a flow diagram for key generation method for producing a key for a digital signature.

Next, key generation will be described. FIG. 2 illustrates a flow diagram for key generation method 200 for producing a key for a digital signature. First, the method begins at step 205, and then at step 210, the root HSM generates global public key parameters global_pk_params. Depending on the scheme and exact implementation, global_pk_params may be empty and this step may be omitted.

Next, at step 215 each of the initial HSMs is provided with the global_pk_params. At step 220, the initial HSMs run key generation for their subtrees and output the sub-public key that belongs to its subtree.

Then for each virtual HSM, at step 225, the root HSM picks a cryptographically strong random seed, generates a subtree based on that seed, and remembers the corresponding sub-public key.

Next, at step 230 the root HSM receives the sub-public keys of all initial HSMs. The root HSM, using the sub-public keys of the virtual HSMs, then computes the root of the tree structure and hence the overall public key which it outputs.

At step 235, in addition to the public key, the root HSM outputs all sub-public keys. These are also distributed to all initial HSMs.

Finally, at step 240 the root HSM splits the seed of each virtual HSM into C key shares using a secret sharing protocol such as Shamir's secret sharing. The key shares or a portion of the key shares may be used to generate a key for the stateful hash-based signature. The generated key may then be used to digitally sign a message. If S=C, the seeds may also be broken into C−1 random values plus an additional share that equals the XOR of share_1 XOR share_2 XOR . . . XOR share_(C−1). At step 245, for each virtual HSM each custodian receives one share of the seed. There are multiple ways to do this key distribution, for example the following steps may be used. First, personal encryption keys for each custodian are installed in the root HSM. The root HSM then produces encrypted outputs which can be sent to the corresponding custodians. The seeds are displayed or printed in a procedure where only one custodian is in a room at a time to retrieve their seeds. Printing could happen on special paper adding coating to scratch off (like for lottery tickets). The key generation method 200 then ends at step 250.

A virtual HSM instantiation will now be described. In addition to the normal key generation procedure, HSMs used for this method and system will implement an initialize_from_seed procedure. This procedure expects the following parameters: S of the C seed shares; the list of all sub-public keys and global_pk_params if not empty (or the public key containing global_pk_params). The HSM then computes the seed from the seed shares and is then ready to use the seed together with the PRF to generate any part of its subtree and create signatures. To finalize the instantiation procedure, all C custodians must destroy their seed share corresponding to this virtual HSM. This guarantees that a real HSM is only instantiated for a given virtual HSM once.

Signature creation will now be described. Any of the instantiated HSMs may be picked to create a signature for the public key as long as the HSM still has unused one-time programmable (OTP) leaves left. The signature creation starts by creating a signature as described in the chosen stateful hash-based signature scheme for the one-time signature (OTS) scheme and the lower H-h layers of the tree (this is the subtree completely belonging to the signing key on this HSM). To compute the hashes for the path through upper h layers, the HSM must use the list of sub-public keys it has received before.

If an HSM uses its last available OTP leaf when creating a signature it should, after output of the signature, delete all private key material and output a message that its state space is depleted.

Additional sub-division of virtual HSMs may be carried out and will now be described. When instantiating a virtual HSM it is also possible to divide the subtree further by having an additional layer of virtual HSMs. For this, the method from FIG. 2 may be used in a slightly adopted fashion where the selection of random values is completely replaced by values derived with a PRF from the seed of the virtual HSM at the root of the subtree. This sub-division approach may be interesting when the complete subtree should not be instantiated on a single HSM immediately.

One application of this idea is the pre-generation of public keys for secure boot. When provisioning a device it is often equipped with more than one public key to verify secure boot images. This allows, e.g., for revoking a secure boot key pair that has been compromised and start using a different one (that was previously unused). In this scenario, there are public keys that must be known during provisioning of the device but which will not be used unless another key is revoked. For such keys, it may be interesting to virtualize a complete tree getting only the public key and shares of private key seeds out. The generation is a special case of the ideas described above with I=0 and V=1. However, once this virtual tree is instantiated, it is interesting to not immediately instantiate all of it on one HSM (due to the challenges with that as discussed above) but to then chose a value V' (power of two) of sub virtual HSMs into which this virtual key is split. Afterwards, HSMs can be instantiated from these sub virtual HSMs as described above.

Figure 3:
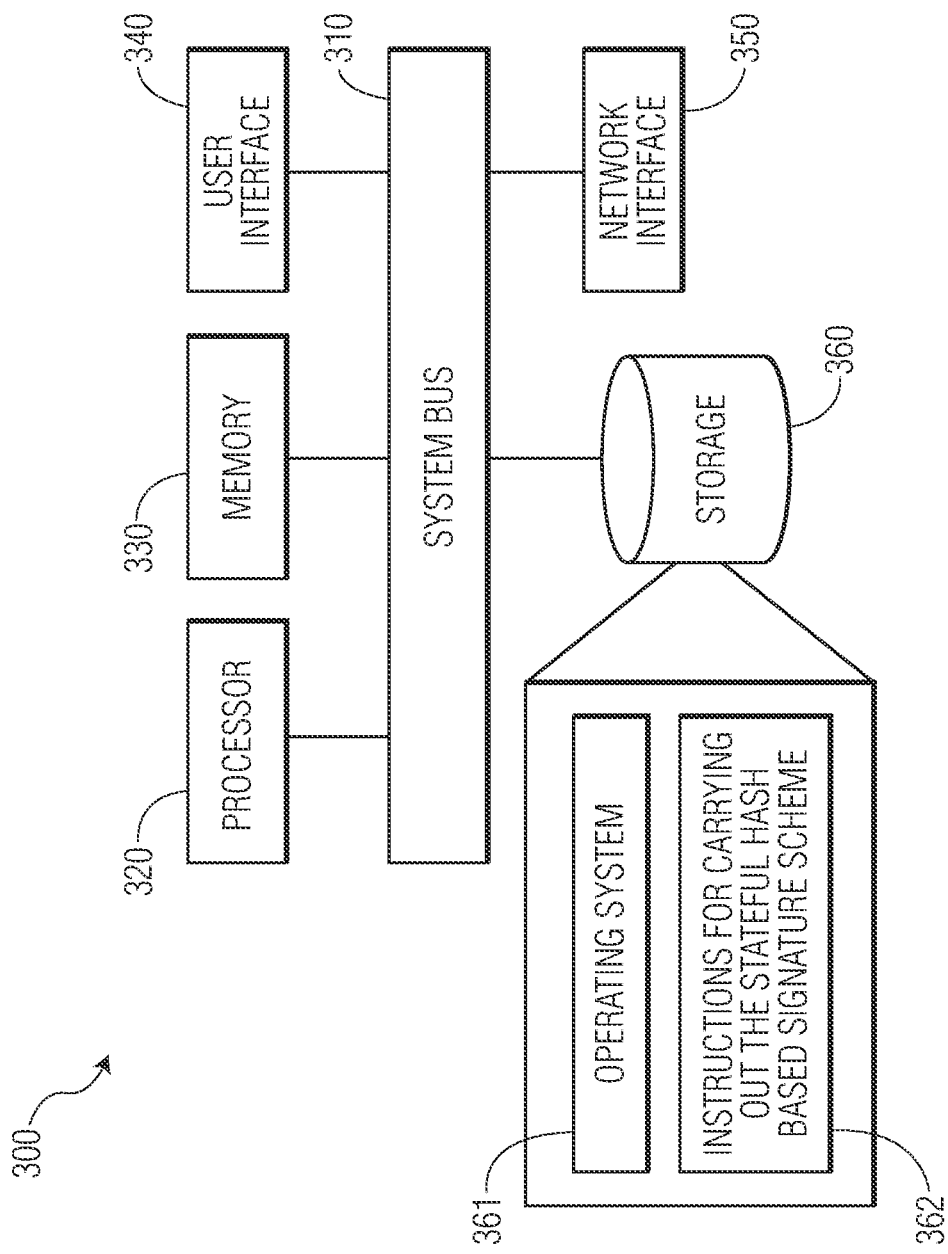
FIG. 3 illustrates an exemplary hardware diagram for implementing the stateful hash based signature method.

FIG. 3 illustrates an exemplary hardware diagram 300 for implementing the stateful hash based signature method. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 340 may include one or more devices for enabling communication with a user such as an administrator or custodian. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 362 may include instructions for carrying out the signature methods described above.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

The system bus 310 allows communication between the processor 320, memory 330, user interface 340, storage 360, and network interface 350.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method of producing a key for a stateful hash-based digital signature, comprising:
   providing a plurality of initial hardware security modules (HSM) with global public key parameters;
   running key generation by the plurality of initial HSMs to produce sub-public keys for respective sub-trees associated with the plurality of initial HSMs based upon the global public key parameters;
   picking a random seed and generating a sub-public key and a sub-tree based upon the random seed for a plurality of virtual HSMs;
   sending the sub-public keys of the plurality of initial HSMs to a root HSM;
   computing by the root HSM an overall public key of a tree structure associated with the root HSM;
   distributing the sub-public keys for the initial HSMs to the plurality of initial HSMs;
   splitting the random seed of the virtual HSMs into a plurality of key shares of the key for the stateful hash-based digital signature; and
   providing custodians associated with the plurality of virtual HSMs a key share from the plurality of key shares.

2. The method of claim 1, further comprising generating the global public key parameters by the root HSM.

3. The method of claim 1, further comprising remembering a sub-public key of the plurality of virtual HSMs.

4. The method of claim 1, wherein the random seed is a cryptographically strong random seed.

5. The method of claim 1, further comprising:
   installing personal encryption keys for each custodian in the root HSM; and
   encrypting the key shares with personal encryption keys associated with the custodian.

6. The method of claim 1, further comprising privately displaying a key share of the plurality of key shares with an associated custodian.

7. The method of claim 1, further comprising defining a number of initial HSMs in the plurality of initial HSMs and a number of virtual HSMs in the plurality of virtual HSMs.

8. The method of claim 1, further comprising signing a message with a signature key associated with a leaf in one of the plurality of initial HSMs.

9. The method of claim 1, further comprising signing a message with a signature key associated with a leaf in one of the plurality of virtual HSMs.

10. The method of claim 1, further comprising dividing a sub-tree associated with an instance of a virtual HSM by adding an additional layer to the sub-tree associated with the instance of the virtual HSM.

11. A key generating device for a stateful hash-based digital signature, comprising:
a root hardware security module (HSM);
a plurality of initial HSMs; and
a plurality of virtual HSMs with custodians associated with the plurality of virtual HSMs, wherein the root HSM is configured to:
provide the plurality of initial HSMs with global public key parameters;
pick a random seed and generate a sub-public key and a sub-tree based upon the random seed for the plurality of virtual HSMs;
compute an overall public key of a tree structure associated with the root HSM;
distribute the sub-public keys for the initial HSMs to the plurality of initial HSMs;
split the random seed of the virtual HSMs into a plurality of key shares of the key for the stateful hash-based digital signature; and
provide the custodians associated with the plurality of virtual HSMs a key share from the plurality of key shares;
wherein the plurality of initial HSMs are configured to:
run key generation to produce sub-public keys for respective sub-trees associated with the plurality of initial HSMs based upon the global public key parameters; and
send the sub-public keys of the plurality of initial HSMs to the root HSM.

12. The key generating device of claim 11, wherein the root HSM is further configured to generate the global public key parameters by the root HSM.

13. The key generating device of claim 11, wherein the root HSM is further configured to remember the sub-public key of the plurality of virtual HSMs.

14. The key generating device of claim 11, wherein the random seed is a cryptographically strong random seed.

15. The key generating device of claim 11, wherein the root HSM is further configured to:
install personal encryption keys for each custodian in the root HSM; and
encrypt the key shares with personal encryption keys associated with the custodian.

16. The key generating device of claim 11, wherein the root HSM is further configured to privately display a key share of the plurality of key shares with an associated custodian.

17. The key generating device of claim 11, wherein the root HSM is further configured to define a number of initial HSMs in the plurality of initial HSMs and a number of virtual HSMs in the plurality of virtual HSMs.

18. The key generating device of claim 11, wherein one of the plurality of initial HSMs is further configured to sign a message with a signature key associated with a leaf in one of the plurality of initial HSMs.

19. The key generating device of claim 11, wherein the one of the plurality of virtual HSMs is further configured to sign a message with a signature key associated with a leaf in one of the plurality of virtual HSMs.

20. The key generating device of claim 11, wherein the root HSM is further configured to divide a sub-tree associated with an instance of a virtual HSM by adding an additional layer to the sub-tree associated with the instance of the virtual HSM.

* * * * *